(12) United States Patent
Weldon

(10) Patent No.: US 9,657,656 B2
(45) Date of Patent: May 23, 2017

(54) IDLE AIR CONTROL VALVE FOR USE IN A SMALL ENGINE AND HAVING A PROTECTIVE SHROUD WITH VALVE SEAT

(71) Applicant: Continental Automotive Systems, Inc., Auburn Hills, MI (US)

(72) Inventor: Craig Andrew Weldon, Chatham (CA)

(73) Assignee: Continental Automotive Systems, Inc., Auburn Hills, MI (US)

(*) Notice: Subject to any disclaimer, the term of this patent is extended or adjusted under 35 U.S.C. 154(b) by 227 days.

(21) Appl. No.: 14/469,625

(22) Filed: Aug. 27, 2014

(65) Prior Publication Data

US 2016/0061122 A1 Mar. 3, 2016

(51) Int. Cl.
| | | |
|---|---|---|
| *F02D 31/00* | (2006.01) | |
| *F16K 1/38* | (2006.01) | |
| *F16K 27/02* | (2006.01) | |
| *F02D 9/12* | (2006.01) | |
| *F02D 9/02* | (2006.01) | |

(52) U.S. Cl.
CPC ............ *F02D 31/003* (2013.01); *F02D 9/12* (2013.01); *F16K 1/38* (2013.01); *F16K 27/0254* (2013.01); *F02D 2009/0205* (2013.01)

(58) Field of Classification Search
CPC .. F02D 31/003; F02D 9/12; F02D 2009/0205; F02D 11/10; F16K 1/38; F16K 27/0254; F16K 31/041; F16K 31/50; F16K 1/54
USPC .............. 251/121–122, 129.11–129.13, 267; 123/339.1, 339.14, 339.25
See application file for complete search history.

(56) References Cited

U.S. PATENT DOCUMENTS

| | | | | |
|---|---|---|---|---|
| 4,346,728 A | * | 8/1982 | Sulzer ..................... | F16K 29/00 251/267 |
| 4,412,517 A | * | 11/1983 | Kobashi ................. | F02M 3/075 123/339.26 |
| 4,650,156 A | * | 3/1987 | Kawahira ............... | F16K 31/04 251/129.11 |
| 4,725,041 A | * | 2/1988 | Chauvin .............. | F02M 51/005 239/585.2 |
| 4,789,132 A | * | 12/1988 | Fujita ....................... | F16K 1/12 251/122 |

(Continued)

OTHER PUBLICATIONS

Dian et al., Idle Air control Valve for the Small Engine Market, JSAE 20139163/SAE 2013-32-9163, Jul. 25, 2013.

(Continued)

*Primary Examiner* — John Bastianelli

(57) ABSTRACT

A linear actuator includes a stator assembly and a rotor assembly operatively associated with the stator assembly and mounted for rotation with respect to the stator assembly. A shaft is restricted from rotation and is associated with the rotor assembly such that rotation of the rotor assembly causes linear movement of the shaft. A capnut is associated with a distal end of the shaft for movement therewith. A shroud is coupled to the stator assembly and substantially surrounds the capnut. The shroud includes a valve seat, and an inlet communicating with an outlet through a throttle opening adjacent to the valve seat. The shaft and associated capnut are constructed and arranged to move relative to the valve seat to control air flow between the inlet and the outlet.

11 Claims, 2 Drawing Sheets

(56) References Cited

U.S. PATENT DOCUMENTS

| | | | | |
|---|---|---|---|---|
| 4,844,339 A * | 7/1989 | Sayer | F02M 69/08 239/5 |
| 4,948,091 A * | 8/1990 | Satoh | F16K 1/12 251/129.11 |
| 5,239,961 A * | 8/1993 | Neidhard | F02D 9/16 123/339.25 |
| 5,364,066 A * | 11/1994 | Dorste | F16K 1/38 251/122 |
| 5,419,531 A * | 5/1995 | Hoehn | F16K 1/38 251/129.11 |
| 5,692,723 A * | 12/1997 | Baxter | F02M 51/0639 137/550 |
| 6,016,832 A * | 1/2000 | Vars | F02M 21/023 251/122 |
| 6,076,803 A * | 6/2000 | Johnson | F16K 31/0655 251/129.22 |
| 6,460,567 B1 * | 10/2002 | Hansen, III | F16K 31/04 137/554 |
| 6,492,751 B1 * | 12/2002 | Ineson | H02K 1/145 251/129.11 |
| 6,561,480 B1 * | 5/2003 | Komiya | F16K 1/38 251/122 |
| 6,674,208 B2 * | 1/2004 | Ineson | H02K 1/145 310/190 |
| 7,325,780 B2 * | 2/2008 | Arai | F16K 31/04 251/129.11 |
| 7,608,952 B2 * | 10/2009 | Weldon | F16N 15/00 310/80 |
| 2004/0188650 A1 * | 9/2004 | Nalini | F16C 19/18 251/129.11 |
| 2006/0261302 A1 * | 11/2006 | Inoue | F16K 1/04 251/129.11 |
| 2007/0018128 A1 * | 1/2007 | Arai | F16K 31/04 251/129.11 |
| 2008/0121833 A1 | 5/2008 | Weldon et al. | |

OTHER PUBLICATIONS

Weldon et al., Optimization of an Automotive Grade Stepper Motor Idle Air control Valve for the Small Engine Market, SAE 2012-32-0040/JSAE 201290490, 2012.

* cited by examiner

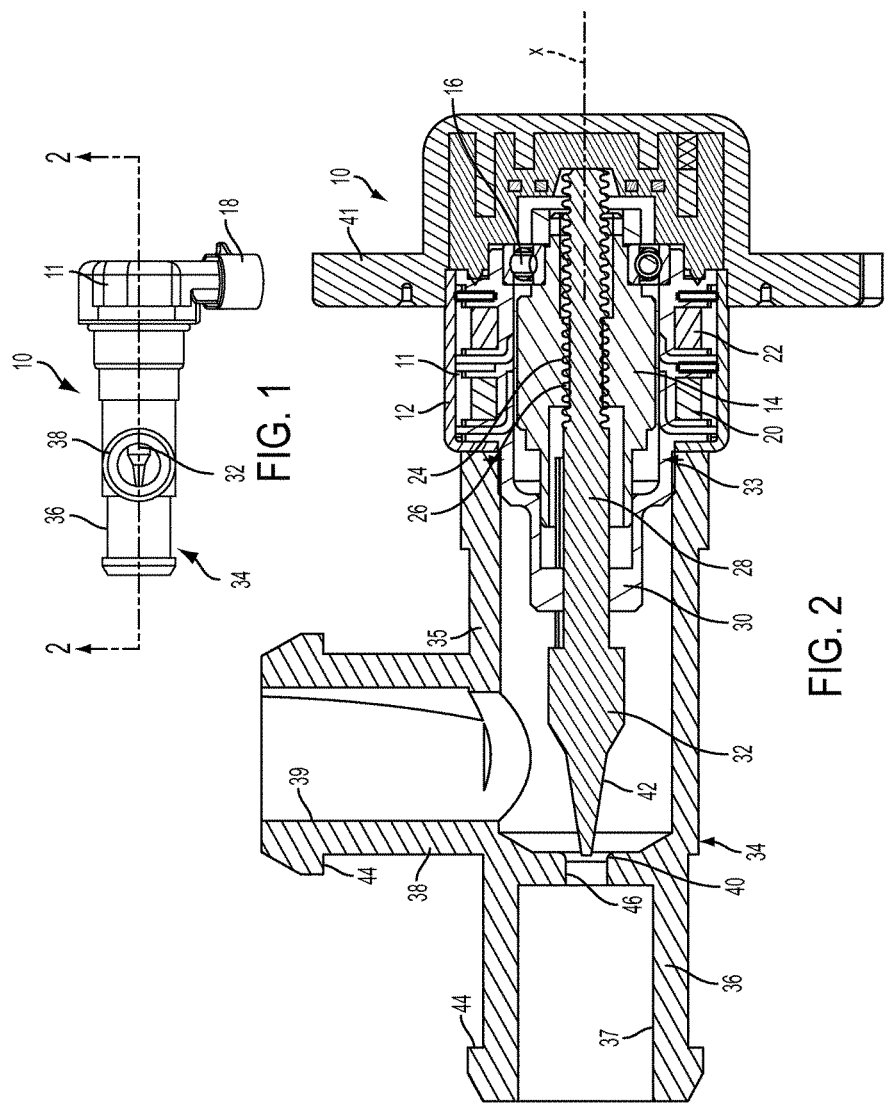

IDLE AIR CONTROL VALVE FOR USE IN A SMALL ENGINE AND HAVING A PROTECTIVE SHROUD WITH VALVE SEAT

FIELD

This invention relates to an idle air control valve (IACV) and, more particularly, to an IACV for use in a small engine with the IACV having a shroud for protecting the cap nut and having an improved valve seat.

BACKGROUND

The IACV is a digital linear actuator (DLA) that accurately controls throttle airflow in an engine system. The need for using an IACV is that pollution emission control regulations require more precise air/fuel ratios in engines so as to produce cleaner emissions. Alternative flow control uses for a DLA are for a fuel cell or Positive Crankcase Ventilation (PCV).

IACVs are being developed for the small engine market such as, for use in two and three-wheeled motorcycles, off-road recreational vehicles, marine outboard motors, portable generators, lawn and garden power tools, etc., to reduce emissions. A throttle valve seat diameter, in the throttle body, for these small engines typically ranges between 3-6 mm. The capnut shape of the IACV determines the airflow profile in the throttle body. For an IACV with 8.5 mm linear travel, the capnut becomes very needle-like in shape. Such needle-like capnut is weak and subject to handling damage before final assembly into the throttle body, which may occur after cross-continent travel.

Thus, there is a need to provide a shroud for protecting the capnut of an IACV for use in a small engine, with the shroud also defining the valve seat.

SUMMARY

An object of an embodiment is to fulfill the need referred to above. In accordance with the principles of an embodiment, this objective is obtained by providing a linear actuator that includes a stator assembly and a rotor assembly operatively associated with the stator assembly and mounted for rotation with respect to the stator assembly. A shaft is restricted from rotation and is associated with the rotor assembly such that rotation of the rotor assembly causes linear movement of the shaft. A capnut is associated with a distal end of the shaft for movement therewith. A shroud is coupled to the stator assembly and substantially surrounds the capnut. The shroud includes a valve seat, and an inlet communicating with an outlet through a throttle opening adjacent to the valve seat. The shaft and associated capnut are constructed and arranged to move relative to the valve seat to control air flow between the inlet and the outlet.

In accordance with another aspect of an embodiment, a method protects a capnut of a linear actuator. The actuator includes a stator assembly and a rotor assembly operatively associated with the stator assembly and mounted for rotation with respect to the stator assembly. A shaft is restricted from rotation and is associated with the rotor assembly such that rotation of the rotor assembly causes linear movement of the shaft. A capnut is associated with a distal end of the shaft for movement therewith. The method couples a shroud to the stator assembly so as to substantially surround the capnut. The shroud provides a valve seat, and an inlet communicating with an outlet through a throttle opening adjacent to the valve seat so that the shaft and associated capnut can move relative to the valve seat to control air flow between the inlet and the outlet.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 1 is a side view of a digital linear actuator in the form of a remote hose connect idle air control valve in accordance with an embodiment of the invention.

FIG. 2 is a cross-sectional view taken along the line 2-2 in FIG. 1.

DETAILED DESCRIPTION OF THE EXEMPLARY EMBODIMENTS

Figure 3:
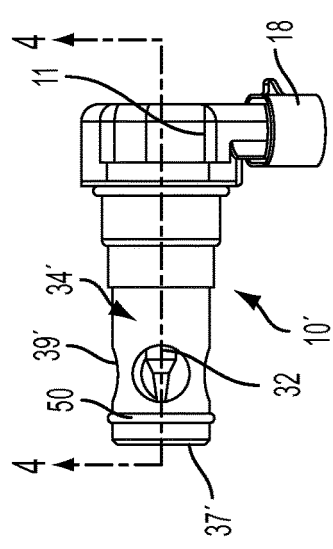
FIG. 3 is a side view of a digital linear actuator in the form of a mechanical throttle body integrated idle air control valve in accordance with another embodiment of the invention.

With reference to FIG. 1, an idle air control valve (IACV) is shown, generally indicated at 10, in accordance with an embodiment. The IACV 10 includes an electric motor 11, preferably in the form of a stepper motor that provides linear actuation for the IACV 10. The IACV 10 can be used in small engines such as, two and three-wheeled motorcycles, off-road recreational vehicles, marine outboard motors, portable generators, lawn and garden power tools, etc., to reduce emissions.

The motor 11 is of the type disclosed in US Patent Application Publication No. 20080121833, the content of which is hereby incorporated by reference into this specification. Thus, with reference to FIG. 2, the motor 11 includes a stator assembly 12 and a rotor assembly 14 is associated with the stator assembly 12. A bearing 16 supports and permits rotation of the rotor assembly 14 relative to the stator assembly 12 and about a central axis X.

An electrical connector 18 is employed for providing a source of electrical current to the coil windings 20, 22. In the embodiment of motor 11 as a stepper motor, introduction of a current in the coil windings 20, 22 of the stator assembly 12 causes rotational movement of the rotor assembly 14. The rotor assembly 14 has a threaded portion 24 for engagement with a threaded portion 26 of shaft 28. The shaft 28 is restricted from rotating via a front bearing 30. Therefore, rotational motion of rotor assembly 16 is converted into linear motion of shaft 28 via the threaded interface, making this stepper motor 11 a linear actuator. The shaft 28 is constructed and arranged to have a linear travel of about 8.5 mm. One skilled in the art will appreciate that the present embodiment could be utilized in various alternative embodiments of magnetic devices regardless of whether such devices are of single or multiple phase construction. Moreover, in response to an electrical input, such alternative embodiments could be constructed to provide a different output such as in a rotary stepper motor, or in a motor which provides continuous rotary motion or the like.

As shown in FIG. 2, a distal end of the shaft 28 is coupled to or integral with the capnut 32 that moves linearly with the shaft 28. The shaft 28 and capnut can be of plastic or metal, but can be damaged during handling and/or shipping. In accordance with the embodiment, a shroud, generally indicated at 34, is coupled to the stator assembly 12, preferably at the bearing 30, by a weld connection 33 so that the shroud 34 is aligned about axis X. The shroud 34 substantially surrounds the capnut 32 so as to protect the capnut 32 from handling during transport and assembly. The shroud 34 remains part of the IACV 10 after final assembly.

The shroud 34 has a body 35 that includes an inlet port connector 36, defining an inlet 37 of the IACV 10, and an outlet port connector 38, defining an outlet 39 of the IACV 10. The inlet 37 communicates with the outlet 39 through a throttle opening 46 in the body 35 and adjacent to the valve seat 40. The capnut 32 is moveable with respect to the valve seat 40 to control airflow from the inlet 37, through opening 46, past the valve seat 40, to the outlet 39. The surface defining the valve seat 40 is a hard radius surface communicating with opening 46 so the radius surface can be engaged annularly by the tapered portion 42 of the capnut 32 to form an annular seal. Preferably, the outlet 39 is disposed transversely with respect to the inlet 37, with the inlet 37 being disposed along the axis X. As noted above, since the engine is a small engine, a diameter of a throttle opening 46 is between about 3-6 mm.

Each of the inlet port connector 36 and the outlet port connector 38 includes a flange 44 defining a barb that can engage and retain a hose (not shown) so as that the IACV 10 can be coupled remotely with a mechanical throttle body to control airflow to an engine. The IACV 10 also includes a mounting flange 41 for coupling to a member associated therewith.

Figure 4:
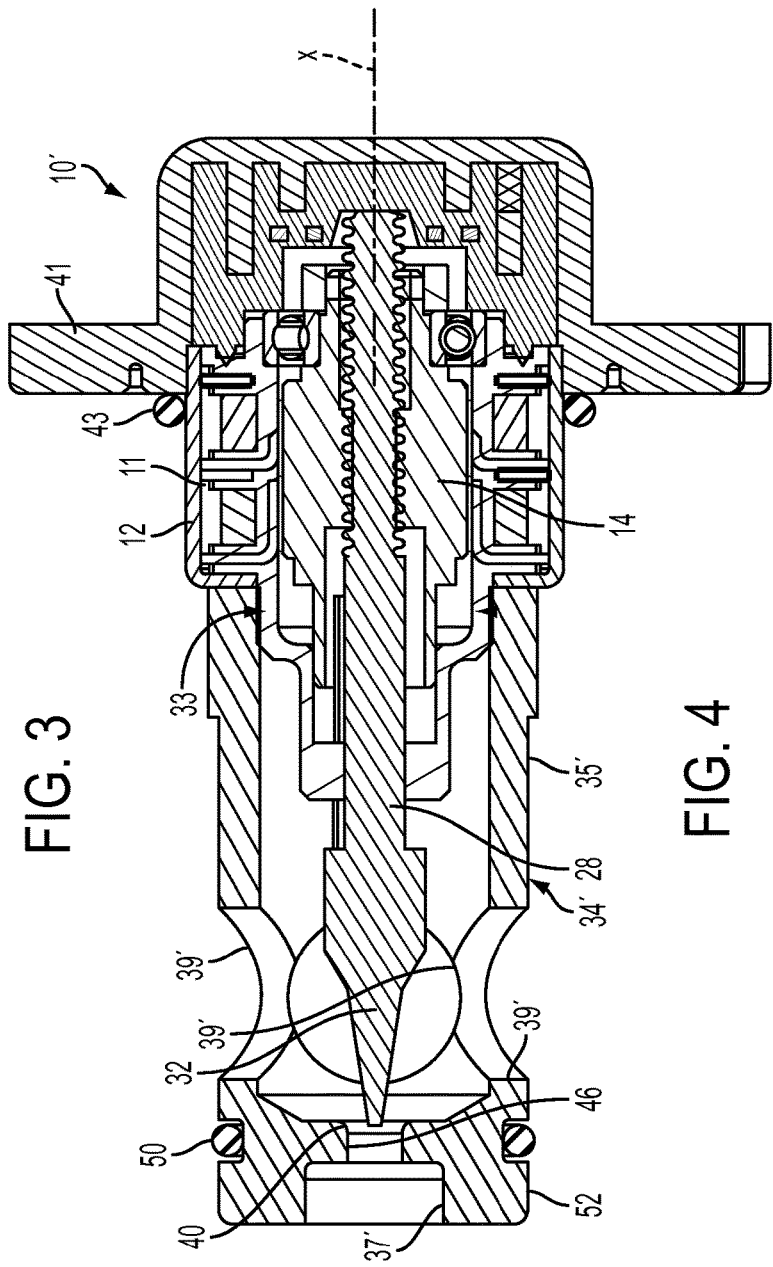
FIG. 4 is a cross-sectional view taken along the line 4-4 in FIG. 3.

With reference to FIGS. 3 and 4, another embodiment of the shroud 34' is shown. Instead of providing the integral inlet port connector 36 and outlet port connector 38, the body 35' of the shroud 34' is generally cylindrical and includes an inlet 37' communicating with outlets 39' through the valve seat 40. The inlet 37' and the outlets 39' are machined or molded through walls of the body 35'. An O-ring 50 is provided on a periphery of the shroud 34' near the distal end 52 thereof and is used as an internal seal to isolate the pressures of the inlet 37' and the outlet 39' when the shroud 34' is mounted directly to the intake manifold or throttle body of an engine. The valve seat 40 is preferably integral with the body 35', but can be defined in a separate member that is coupled to the body 35'. If the valve seat 40 is defined in a separate member and coupled to the body 35' of the shroud 34', the separate member can still be considered to be part of the shroud 34'. The IACV 10' also includes a mounting flange 41 for coupling directly to a throttle body or manifold using an O-ring 43 as an external seal.

Thus, the shroud 34, 34' provides protection of the capnut 32 from handling during shipping and assembly and also advantageously incorporates the valve seat 40 that would otherwise need to be machined into the mechanical throttle body.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An idle air control valve in combination with an engine, the idle air control valve for controlling airflow to the engine to reduce emissions, the combination comprising:
   the engine;
   the idle air control valve comprising:
   a stator assembly having a housing and windings disposed within in the housing,
   a rotor assembly operatively associated with the windings and mounted for rotation with respect to the stator assembly,
   a shaft restricted from rotation and engaged with the rotor assembly such that rotation of the rotor assembly causes linear movement of the shaft,
   a capnut associated with a distal end of the shaft for movement therewith,
   a shroud associated with an end of the housing and substantially surrounding the capnut, the shroud including a valve seat, and an inlet communicating with at least one outlet through a throttle opening adjacent to the valve seat, and
   a mounting flange coupled to the stator assembly and constructed and arranged to mount the idle air control valve to a portion of the engine,
   wherein the shaft and associated capnut are constructed and arranged to move relative to the valve seat to control air flow between the inlet and the outlet,
   wherein the shroud has a body including an integral inlet port connector defining the inlet and an integral outlet port connector defining the at least one outlet, and
   wherein each connector includes a barbed flange at an end thereof constructed and arranged to engage and retain an associated hose when coupled thereto.

2. The idle air control valve of claim 1, wherein the shaft is constructed and arranged to have a linear travel of about 8.5 mm.

3. The idle air control valve of claim 1, wherein a diameter of the throttle opening is between about 3-6 mm.

4. The idle air control valve of claim 1, wherein the at least one outlet is disposed generally transversely with respect to the inlet.

5. The idle air control valve of claim 1, wherein the shroud has a generally cylindrical body, with the inlet and the at least one outlet being defined through walls of the body.

6. The idle air control valve of claim 5, wherein the at least one outlet is disposed generally transversely with respect to the inlet.

7. An idle air control valve in combination with an engine, the idle air control valve for controlling airflow to the engine to reduce emissions, the combination comprising:
   the engine;
   the idle air control valve comprising:
   a stator assembly having a housing and windings disposed within in the housing,
   a rotor assembly operatively associated with the windings and mounted for rotation with respect to the stator assembly,
   a shaft restricted from rotation and associated with the rotor assembly such that rotation of the rotor assembly causes linear movement of the shaft, and a capnut associated with a distal end of the shaft for movement therewith,
   a shroud coupled to an end of the housing and constructed and arranged to substantially surround the capnut,
   a valve seat in the shroud, an inlet, defined in a distal end of the shroud, communicating with at least one outlet, defined in the shroud, through a throttle opening adjacent to the valve seat, and a mounting flange coupled to the stator assembly and constructed and arranged to mount the idle air control valve to a portion of the engine, wherein the distal end of the shroud includes an O-ring on a periphery thereof so as to provide a seal for the inlet when the distal end of the shroud is coupled to the portion of the engine.

8. The idle air control valve of claim 7, wherein a diameter of the throttle opening is between about 3-6 mm.

9. The idle air control valve of claim 7, wherein the at least one outlet is disposed generally transversely with respect to the inlet.

10. The idle air control valve of claim 7, wherein the shroud is generally cylindrical with the inlet and the at least one outlet being defined through walls of the body.

11. The idle air control valve of claim 10, wherein the shroud defines a plurality of outlets through the walls of the body.

\* \* \* \* \*